United States Patent [19]

Srail

[11] 3,880,787
[45] Apr. 29, 1975

[54] BENZOTHIAZOLE ACCELERATOR SYSTEMS

[75] Inventor: Raymond C. Srail, Parma, Ohio

[73] Assignee: The B. F. Goodrich Company, New York, N.Y.

[22] Filed: Mar. 19, 1973

[21] Appl. No.: 342,747

Related U.S. Application Data

[63] Continuation-in-part of Ser. No. 118,172, Feb. 23, 1971, abandoned.

[52] U.S. Cl... 260/23.5 R; 260/23.5 A; 260/23.7 N; 260/23.7 H; 260/23.7 B; 260/23.7 C; 260/79.5 A; 260/79.5 B; 260/785; 260/786; 260/788; 260/794; 260/894
[51] Int. Cl..... C08c 11/64; C08c 11/48; C08d 9/00
[58] Field of Search .......... 260/79.5 R, 79.5 B, 794, 260/887, 894, 23.7 N, 23.7 H, 23.7 B

[56] References Cited

UNITED STATES PATENTS

| 1,904,573 | 4/1933 | Tuley | 260/794 |
|---|---|---|---|
| 3,135,716 | 6/1964 | Uraneck | 260/45.5 |

Primary Examiner—Christopher A. Henderson
Attorney, Agent, or Firm—J. Hughes Powell, Jr.

[57] ABSTRACT

Improved accelerator systems comprising a benzothiazole accelerator and an amine-blocked diisocyanate are provided for vulcanization of polymers. These accelerator systems are stable during processing, thereby minimizing scorch of the polymer, but at vulcanization temperatures provide very rapid cures.

7 Claims, No Drawings

BENZOTHIAZOLE ACCELERATOR SYSTEMS

CROSS-REFERENCE TO RELATED APPLICATION

This application is a continuation-in-part of application Ser. No. 118,172 filed Feb. 23, 1971 now abandoned.

BACKGROUND OF THE INVENTION

Various benzothiazole compounds are well known accelerators used throughout the industry to provide rapid cures for a wide variety of polymers as rubbers and elastomers. These compounds reduce the time required for vulcanization so that increased outputs are obtained as well as more uniform cures. It would be most advantageous if the benzothiazole accelerators could be made even more active so that even greater cure rates could be obtained. It would be particularly desirable if with these activated benzothiazole accelerator systems there was little or no effect on the scorch at temperatures typically employed for processing elastomers. It would then be possible to obtain very rapid cure with little or no reduction in the scorch time of the rubber. For the rubber compounder this would minimize or completely eliminate any change in the compounding and processing of the rubber stock prior to vulcanization as is often required when more active accelerators are employed.

Activators for accelerators are known. For example, diphenyl guanidine and its derivatives are often combined with other accelerator compounds to obtain improved cure rates. However, both components of the mixture function as accelerators and while the cure rate is generally improved there is a proportional decrease in the scorch time at lower temperatures. It would be highly advantageous to have an accelerator system wherein as the cure rate is increased the scorch time is not proportionately decreased.

SUMMARY OF THE INVENTION

Compositions comprising (1) a sulfur vulcanizable rubber, (2) sulfur or a sulfur donor, (3) a metal vulcanization activator, and (4) an accelerator system consisting essentially of (a) a 2-thiobenzothiazole accelerator and (b) a blocked isocyanate of (i) an amine having a pK dissociation constant of about 4 or below and (ii) a diisocyanate selected from diphenyldiisocyanates and aromatic diisothiocyanates, have an improved balance of scorch safety at processing temperatures and rapid cure at vulcanization temperatures.

DETAILED DESCRIPTION

The accelerator system of this invention comprises an amine-blocked diisocyanate with a thiobenzothiazole accelerator, the combination providing an improved balance of scorch safety and rapid cure. The accelerator systems of this invention are useful with any rubber, natural or synthetic, capable of sulfur cure.

Especially useful rubbers for the purposes of the present invention are derived from conjugated diolefins containing from 4 to 6 carbon atoms such as 1,3-butadiene, isoprene, piperylene, 2,3-dimethyl-butadiene-1,3 and the like. The conjugated diolefin will constitute from about 30 to 100% by weight of the overall polymer composition. Also useful are stereoregular rubbers containing 80% or more of the 1,4-addition product which has predominantly one stereo configuration (cis- or trans-). Typical conjugated diolefin-derived homopolymers and copolymers for which the present accelerator system is useful include: natural rubber and synthetic natural rubber (cis-polyisoprene), trans-polyisoprene, polybutadiene, chloroprene polymers (neoprene), butyl rubbers (copolymers of isobutylene and isoprene), GR-S (copolymers of styrene and butadiene), nitrile rubbers (copolymers of butadiene and acrylonitrile) and copolymers of conjugated diolefins with lower alkyl acrylates or lower alkyl methacrylates or similar monomers. Such rubber compositions contain olefinic unsaturation

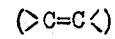

constituting from about 0.5 to 50% by weight of the overall polymer composition.

The present accelerator systems are also useful for polymers derived from α-monoolefins which contain olefinic unsaturation as a result of polymerizing one or more monomers containing multiple unsaturation. Such polymers include, for example, ethylene-propylene-diene and ethylene-butene-diene terpolymers wherein the diene monomers will typically be 1,4-hexadiene, methyl-1,4-hexadiene, a 1,4,9-decatriene, a methyl-1,4,9-decatriene, dicyclopentadiene, vinylcyclohexene, vinyl norbornene, ethylidene norbornene, methylenenorbornene, methyl norbornadiene, methyltetrahydroindene and the like. α-Olefin-derived polymers of this type may contain about 0.3 to 20% by weight of the diene monomer polymerized with about 30 to 80% by weight ethylene and 20 to 70% by weight propylene or butene-1.

In addition to the above-mentioned preferred rubber compositions derived from conjugated diolefins and α-monoolefins, the present accelerator systems are also effective to obtain rapid cure with minimum scorch with other sulfur-vulcanizable polymers such as polyoctenomers and polypentenomers, silicone rubbers, thiokols, acrylate rubbers and other related compositions. Any sulfur curable polymers will be effectively cured and are within the scope of the present invention.

The improved accelerator systems of this invention contain as one of the essential components a benzothiazole compound which is substituted in the 2-position with a thio radical. Any 2-thiobenzothiazole which functions as a vulcanization accelerator may be employed with the amine-blocked diisocyanate and is within the scope of the present invention. The benzothiazole compounds have the structural formula

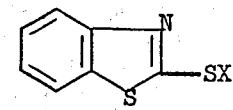

wherein X is a member selected from the group consisting of hydrogen; 2-thiobenzothiazole; substituted mino; alkyl; aryl; halo-, nitro-, anilino- and alkyl-substituted aryl; 5- or 6-membered heterocycles containing one or more oxygen, nitrogen or sulfur heteroatoms; a mono- or divalent radical selected from the group ammonium, sodium, potassium, calcium, zinc, cadmium, copper and lead. When X is a divalent metal the second valence of the metal may be satisfied with an alkyl, aryl, substituted-aryl or preferably with a second 2- thiobenzothiazole radical. In this latter instance the compound will correspond to the structure

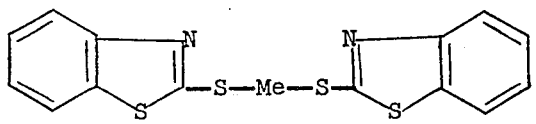

wherein Me is the divalent metal, preferably zinc, cadmium or lead. Exemplary benzothiazole compounds include: 2-mercaptobenzothiazole, sodium 2-mercaptobenzothiazole, potassium 2-mercaptobenzothiazole, ammonium 2-mercaptobenzothiazole, zinc 2-mercaptobenzothiazole, 2-(2,4-dinitrophenylthio)-benzothiazole, N-cyclohexyl-2-benzothiazolesulfenamide, N-oxydiethylene-2-benzothiazolesulfenamide, di-2-benzothiazyl disulfide and the like. Excellent results have been obtained with 2-mercaptobenzothiazole, zinc 2-mercaptobenzothiazole and di-2-benzothiazyl disulfide.

Although the 2-thiobenzothiazoles are especially useful for the purposes of the present invention, other structurally related compounds which are known vulcanization accelerators such as, for example, 2-mercaptoimidazoline and 2-mercaptothiazoline, may also be useful.

The amount of 2-thiobenzothiazole present in the rubber will range between about 0.2 and 5 parts by weight per 100 parts rubber. Excellent results are obtained when from 0.5 to 3 parts of the benzothiazole compound are employed per 100 parts of the rubber.

To obtain optimum advantages of this accelerator system, a vulcanization activator should also be present. Well known vulcanization activators are listed in "Materials and Compounding Ingredients for Rubber," Rubber World, 1970 Edition. These vulcanization activators are typically a metal oxide or hydroxide or a metal salt. The activator may be introduced as part of the accelerator compound as in metal 2-mercaptobenzothiazole, such as zinc 2-mercaptobenzothiazole. If the activator is introduced in the form of a metal oxide about 1 to 10 parts and more preferably from about 1.5 to 4 parts per 100 parts rubber will be added. When a metal oxide is employed it is desirable and advantageous to also add a fatty acid having a total carbon atom content ranging from 12 to 24 carbon atoms, such as stearic acid. It is felt that by the addition of such fatty acids the metal is solubilized so that it may better participate in the vulcanization. The amount of fatty acid employed will range from about 0.5 to 5 parts per 100 parts of the rubber. While the incorporation of metal oxide and fatty acid as separate entities is generally preferred based on economic considerations, if desired, a preformed metal salt of a fatty acid containing from 12 to 24 carbon atoms such as zinc laurate, zinc palmitate, zinc stearate or the like may be employed. If preformed metals are employed they will range from about 0.5 to 5 parts per 100 parts rubber and more preferably from about 0.75 to 2 parts. The metal will generally be a divalent metal such as zinc, cadmium, lead, calcium, iron or the like. Best results are obtained when the metal oxide or metal salt is derived from zinc, cadmium or lead. Zinc oxide and zinc fatty acids are especially useful activators for use with the present activator systems.

The present accelerator systems are useful with a wide variety of rubber compositions which may additionally contain conventional processing aids and oils, fillers, reinforcing agents, extenders, curing additives, cure retarders and modifiers and various stabilizers including antioxidants and antiozonants. Any phenolic stabilizer can be employed in any useful amount. When amine stabilizers are present as antiozonants it is preferred that p-phenylenediamines wherein the amine function is sterically hindered such as N-1,3-dimethylbutyl-N'-phenyl-p-phenylenediamine or other sterically hindered amines be employed.

The amine-blocked isocyanate is formed by the reaction of a diphenyl diisocyanate or an aromatic diisothiocyanate with a dialkylamine or heterocyclic amine. The reaction can be represented as follows

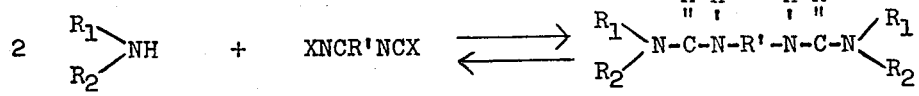

where X is O or S; $R_1$ and $R_2$ are alkyl radicals, either the same or different, containing 1 to 6 carbon atoms or $R_1$ and $R_2$ together with the nitrogen atom form a heterocyclic amine containing 3 to 8 atoms of carbon, nitrogen, oxygen and/or sulfur; and R' is a bivalent aromatic radical.

The amines employed are strong amines i.e., amines having a pK dissociation constant in aqueous solution of about 4 or below (see Lange's Handbook of Chemistry, Revised 10th Edition, Page 1214 (1967) and Handbook of Chemistry and Physics, 45th Edition, Page D-76 (1964)). The amines can be dialkyl amines wherein the alkyl radicals contain 1 to 6 carbon atoms or heterocyclic amines. Examples of the amines are dimethylamine, diethylamine, dipropylamine, diisopropylamine, dibutylamine, diamylamine, methylethylamine, and the like, and heterocyclic amines such as pyrrolidine, piperidine, 2-, 3-, or 4-pipecoline, and the like.

The diisocyanates employed are diphenyl diisocyanates or aromatic diisothiocyanates. Examples of the diphenyl diisocyanates are diphenylmethane-p,p'-diisocyanate, di(3-methylphenyl)methane-p,p'-diisocyanate, diphenylisopropylidene-p,p'-diisocyanate, di(3-methylphenyl)p,p'-diisocyanate, di-(3-methoxyphenyl)-p,p'-diisocyanate, and the like. Examples of aromatic diisothiocyanates are p-phenylene diisothiocyanate, p-toluene diisothiocyanate, p-3-fluorophenyl diisothiocyanate, naphthalene-1,5-diisothiocyanate, naphthalene-1,8-diisothiocyanate and the like.

Blocked isocyanates are known and are readily prepared by reaction between isocyanates and an amine. The reaction is rapid and essentially quantitative. The reaction is normally conducted in a solvent or diluent to control the reaction temperature. Equimolar or a molar excess of amine for each mol of isocyanate group is usually employed. The reaction may be carried out, for example, in a solvent medium as dry toluene. Because of the reactivity of isocyanate groups with water a dry solvent or diluent is employed. The dried reaction products are generally white friable solids.

The amine-blocked diisocyanates of the present invention are distinguished from known blocked isocyanates by their use to prepare unique sulfur vulcanizable compositions having an improved balance of scorch safety and rapid cure rate. This combination of rapid cure and improved scorch safety is obtainable only with the amine-blocked diisocyanates disclosed herein. For example, U.S. Pat. No. 1,904,573 shows the use of alkyl and/or aromatic urea (monoisocyanate) compounds in curing rubber. However, when these compounds were evaluated in rubber compositions they yielded inferior scorch safety compared to the amine-blocked diisocyanates of the present invention. The improved scorch safety results from using the diphenyl-diisocyanates or aromatic diisothiocyanates to prepare the amine-blocked diisocyanate. There is a definite need for greater scorch safety in rubber compositions, particularly in view of the use of fast-acting accelerators, carbon blacks and other compounding ingredients which tend to accelerate cure, and the use of higher processing and vulcanizing temperatures to increase product output.

When the amine-blocked diisocyanate breaks down at vulcanization temperatures, the liberated amine must act quickly and efficiently to cure the rubber composition. The use of the disclosed dialkylamines and heterocyclic amines, both types further having a pK dissociation constant of about 4 or below, provides rapid cure at vulcanization temperature. Weak amines provide a substantially slower cure rate. For example, U.S. Pat. No. 3,135,716 shows a blocked isocyanate consisting of diphenylamine and tolylene-2,4-diisocyanate. Diphenylamine is a weak amine, having a pK value of 13.1. When the disclosed diphenylamine blocked isocyanate was used in a rubber composition the composition exhibited a substantially longer cure time at vulcanization temperatures than compositions employing the amine-blocked diisocyanates of the present invention.

The total amount of the 2-thiobenzothiazole and amine-blocked diisocyanate in the rubber will range between about 0.5 to 8 parts per 100 parts of the rubber and more preferably from about 1 to 5 parts per 100 parts of rubber. The weight ratio of the amine-blocked diisocyanate to the 2-thiobenzothiazole will be from about 0.2:1 to 4:1 and more preferably from about 0.5:1 to 2:1. The order of addition of the accelerator components is not critical nor is any special processing required with these additives.

To obtain acceptable cures with the present accelerator systems the amount of sulfur employed for vulcanization can range from about 0.3 to about 6 parts by weight per 100 parts of the rubber. It is generally preferred, however, that the sulfur be present from about 0.5 to about 3 parts per 100 parts of the rubber. If sulfur donor compounds such as dithiodimorpholine are employed the amount required will be varied to supply these amounts of sulfur on a theoretical basis. The amount of sulfur will be varied depending on the temperature of cure, the particular rubber, the cure time and the degree of cure desired.

The present accelerator systems are useful for a wide variety of rubber compositions which may additionally contain conventional processing aids fillers, oils, fillers reinforcing agents, extenders, curing additives, cure retardants and modifiers, stabilizers, antioxidants, antiozonants and the like.

The following Examples serve to illustrate the invention more fully but are not intended to limit the scope thereof. In these examples all parts and percentages are reported on a weight basis unless otherwise indicated. Cure and scorch properties were determined with a cone curometer such as described in U.S. Pat. No. 3,494,172 by measuring the torque (in/lbs.) developed with time (min.). Data obtained from the resulting cure curves are as follows: Cure time ($T_c$) the time required to reach 90% of maximum torque ($\tau_{max.}$); scorch time ($T_s$) the time required for the torque to increase two in/lbs. over the minimum torque ($\tau_{min.}$); and cure rate ($CR_{max.}$) equal $\Delta\tau/\Delta T$ determined in lbs./min. at a section of the curve having maximum slope.

EXAMPLE I

A rubber masterbatch was prepared as follows:

| Ingredient | Parts |
|---|---|
| Styrene-butadiene rubber | 65.0 |
| Polybutadiene (98% cis-1,4) | 35.0 |
| Aromatic oil | 40.6 |
| Carbon black | 70.0 |
| Stearic acid | 1.0 |
| Zinc oxide | 2.0 |
| Processing oil | 2.5 |
| Antioxidant/antiozonant | 3.70 |

An accelerator system comprised of 2,2'-benzothiazyl disulfide (MBTS) with an amine-blocked diisocyanate of pyrrolidine and diphenylmethane-p,p'-diisocyanate (PYR/MDI) was evaluated in the above rubber masterbatch and the results compared with the cure obtained with MBTS alone. The amine-blocked diisocyanate (PYR/MDI) and MBTS were milled into the rubber masterbatch at a temperature of 150° ± 5°F. The sulfur was then added and the rubber sample milled for 5 minutes at this same temperature. About 12 to 15 gram samples were placed in the cone curometer cavity and evaluated over the temperature range 220° to 360°F. Torque values were measured and continuously charted, and $T_c$, $T_s$ and $CR_{max.}$ determined and reported in Table I. $T_c$ was not obtained at temperatures below 330°F. due to the long times required to arrive at such values and the lack of significance thereof. The styrene content of a styrene-butadiene rubber was about 23% and the 4 minutes Mooney value at 212°F. was about 50.

TABLE I

| Sample | MBTS (pphr)* | (PYR/MDI) (pphr) | Sulfur (pphr) | Property | Cone Curometer Data Temperature | | | | |
|---|---|---|---|---|---|---|---|---|---|
| | | | | | 360°F. | 330°F. | 280°F. | 240°F. | 220°F. |
| A | 0.88 | 1.03 | 1.65 | $T_c$ | 2.68 | 6.35 | — | — | — |
| | | | | $T_s$ | 1.00 | 1.95 | 11.0 | 63.8 | 155 |
| | | | | $CR_{max.}$ | 29.4 | 11.9 | 1.93 | 0.38 | 0.121 |
| B | 0.88 | None | 1.65 | $T_c$ | 4.34 | 11.05 | — | — | — |
| | | | | $T_s$ | 1.45 | 2.90 | 15.4 | 82.2 | 196 |
| | | | | $CR_{max.}$ | 9.10 | 4.47 | 0.98 | 0.167 | 0.091 |

* pphr = parts per hundred parts rubber

It is seen from the data presented in Table I that improved cure rates are obtained with Sample A containing the accelerator system of the present invention, with excellent scorch protection at temperatures typically employed for processing. It is also significant to note that with Sample A as the cure rate increases with increased temperature the scorch values are not proportionately decreased as they are with Sample B containing MBTS alone. For example, from a comparison of the data obtained for Sample A and B at 330°F. and 360°F. it is seen that with Sample A the cure rate approximately triples with a 30°F. rise in temperature whereas with Sample B the cure rate is only approximately doubled. Scorch times, however, for both Samples A and B are only approximately halved as the temperature is raised 30°F. The advantages of the present improved accelerator systems thus become evident.

A high degree of cure is obtained in a very short time, and the vulcanizates have excellent physical properties. Similar results are obtained when employing the amine-blocked diisocyanates of the present invention with cis-1,4-polyisoprene rubber and pale crepe natural rubber.

TABLE II

| Sample | MBT (pphr) | Amine-blocked diisocyanate (pphr) | Sulfur (pphr) | Property | Cone Curometer Data Temperature | | | | |
|---|---|---|---|---|---|---|---|---|---|
| | | | | | 360°F. | 330°F. | 280°F. | 240°F. | 220°F. |
| C | 0.88 | None | 1.65 | $T_c$ | 4.56 | 13.55 | — | — | — |
| | | | | $T_s$ | 1.60 | 3.20 | 16.9 | 79.5 | 193.5 |
| | | | | $CR_{max}$ | 8.93 | 3.65 | 0.86 | 0.15 | 0.075 |
| D | 0.88 | PYR/MDI[1] 1.03 | 1.65 | $T_c$ | 2.55 | 6.25 | — | — | — |
| | | | | $T_s$ | 0.95 | 1.75 | 11.0 | 61.5 | 153 |
| | | | | $CR_{max}$ | 28.6 | 11.3 | 1.90 | 0.30 | 0.10 |
| E | 0.88 | PYR/MDI[1] 1.45 | 1.54 | $T_c$ | 2.48 | 5.30 | — | — | — |
| | | | | $T_s$ | 0.95 | 1.90 | 11.0 | 60.4 | 161 |
| | | | | $CR_{max}$ | 29.1 | 11.6 | 1.72 | 0.20 | 0.07 |
| F | 1.25 | PYR/MDI[1] 1.45 | 1.65 | $T_c$ | 1.99 | 4.65 | — | — | — |
| | | | | $T_s$ | 0.88 | 1.81 | 9.3 | 52.6 | 129 |
| | | | | $CR_{max}$ | 38.5 | 15.1 | 2.63 | 0.41 | 0.14 |
| G | 0.88 | DMA/MDI[2] 0.90 | 1.65 | $T_c$ | 2.68 | 6.20 | — | — | — |
| | | | | $T_s$ | 0.98 | 1.85 | 9.6 | 53.5 | 131 |
| | | | | $CR_{max}$ | 25.0 | 12.8 | 2.41 | 0.40 | 0.144 |
| H | 1.25 | DMA/MDI[2] 1.28 | 1.65 | $T_c$ | 1.97 | 4.38 | — | — | — |
| | | | | $T_s$ | 0.90 | 1.74 | 8.7 | 46.3 | 114 |
| | | | | $CR_{max}$ | 45.6 | 18.0 | 3.46 | 0.65 | 0.22 |

[1] reaction product of pyrrolidine and diphenylmethane-p,p'-diisocyanate
[2] reaction product of dimethylamine and diphenylmethane-p,p'-diisocyanate

EXAMPLE II

To further demonstrate the advantage of the present improved accelerator systems, 2-mercaptobenzothiazole (MBT) was employed with the rubber masterbatch of Example I. Various amine-blocked diisocyanates were employed to activate the MBT accelerator. Cone curometer data was obtained at temperatures between 220° and 360°F. and reported in Table II.

The utility of the vulcanizates obtained is evident from a consideration of the physical properties of the cured rubber. For example, for Sample F the following physical properties were obtained when cured at 360°F. for varying periods:

| | 2 Minutes | 3 Minutes | 6 Minutes | 12 Minutes | 24 Minutes |
|---|---|---|---|---|---|
| Tensile (psi) | 1950 | 1990 | 2000 | 1900 | 1850 |
| Elongation (%) | 800 | 780 | 790 | 800 | 790 |
| 300% Modulus (psi) | 490 | 520 | 510 | 510 | 510 |

EXAMPLE III

A rubber masterbatch was prepared for use in evaluating various blocked isocyanates. The composition of the masterbatch is as follows (in parts by weight):

| | |
|---|---|
| SBR 1710[1] | 50 |
| Polybutadiene[2] | 50 |
| N285 carbon black | 85 |
| Aromatic oil | 60 |
| Stearic acid | 2 |
| Zinc oxide | 3 |
| Agerite Resin D[3] | 2 |
| Antioxidant[4] | 1.7 |

[1] 23.5% styrene, 76.5% butadiene by weight
[2] 98% cis-1,4-butadiene
[3] polymerized trimethylol/dihydroquinoline
[4] N-1,3-dimethylbutyl-N'-phenyl-p-phenylenediamine Portions of the masterbatch were placed on a two-roll mill maintained at 150°±5°F., and sulfur, 2-mercaptobenzothiazole, and the blocked isocyanate added. 12 to 15 gram samples of the stock were then evaluated as to scorch time, cure time, and maximum torque obtained, using a cone curometer. The sulfur was used at 1.75 parts per 100 parts by weight of the rubber, and the 2-mercaptobenzothiazole at 1.25 parts by weight per 100 parts of the rubber. Comparisons between the amine-blocked diisocyanates of this invention and known blocked isocyanates or ureas are made on an equal mole basis, adjusted for the moles of amine liberated per compound if need be.

The samples prepared and data obtained are as follows:

TABLE III

| Sample | Blocked isocyanate | Parts per 100 parts rubber | $T_s$ at 240°F. minutes | $T_c$ at 360°F. minutes | Maximum torque at 360°F. | $T_c$ 360°F. / $T_s$ 240°F. |
|---|---|---|---|---|---|---|
| 1 | Monomethyl urea | 0.56 | 32.00 | 2.43 | 53.0 | 0.0759 |
| 2 | 1,3-dimethyl urea | 0.63 | 38.60 | 2.93 | 50.3 | 0.0759 |
| 3 | 1,2-diethyl urea | 0.86 | 22.96 | 1.80 | 63.8 | 0.0784 |
| 4 | 1-ethyl-1-phenyl-3-n-butyl urea | 1.61 | 56.20 | 3.61 | 43.0 | 0.0642 |

TABLE III — Continued

| Sample | Blocked isocyanate | Parts per 100 parts rubber | $T_s$ at 240°F. minutes | $T_c$ at 360°F. minutes | Maximum torque at 360°F. | $T_c$ 360°F. / $T_s$ 240°F. |
| --- | --- | --- | --- | --- | --- | --- |
| 5 | 2-phenyl urea | 0.99 | 48.80 | 3.21 | 48.3 | 0.0653 |
| 6 | diphenylamine/toluene diisocyanate product | 1.88 | 67.00 | 3.72 | 46.2 | 0.0555 |
| 7 | dimethylamine/toluene diisocyanate product | 0.96 | 33.66 | 2.07 | 57.8 | 0.0615 |
| 8 | dimethylamine/diphenylmethane-p,p'-diisocyanate product | 1.24 | 57.80 | 2.46 | 54.8 | 0.0426 |
| 9 | pyrrolidine/diphenylmethane-p,p'-diisocyanate product | 1.44 | 63.78 | 2.57 | 53.0 | 0.0403 |
| 10 | pyrrolidine/p-phenylenediisothiocyanate product | 1.24 | 57.40 | 2.50 | 52.5 | 0.0435 |

Samples 1 to 5 use blocked isocyanates within the scope of U.S. Pat. No. 1,904,573; i.e., monoisocyanates. Sample 6 uses the diphenylamine/toluene diisocyanate adduct shown in U.S. Pat. No. 3,135,716. Sample 7 uses the reaction product of dimethylamine and a monophenyldiisocyanate which is outside the scope of the present invention. Samples 8 to 10 employed amine-blocked diisocyanates of the invention. A high value of $T_s$ at 240°F. indicates good processing safety. A low value of $T_c$ at 360°F. indicates fast cure at vulcanization temperature. A low value for the ratio $T_c$ 360°F./$T_s$ 240°F. indicates a good balance between processing (scorch) safety and rapid cure. The lower the value, the more ideal the balance between safety and rate of cure.

It is seen in the data that the amine-blocked diisocyanates of the invention (samples 8 to 10) yielded a significantly lower $T_c/T_s$ value than the known blocked isocyanates. Of further note, samples 4, 5 and 6 are all prepared using phenylamines, and all three samples yielded inferior maximum torque values than the other samples. This indicates that the state of cure of the vulcanizate is inferior when using phenylamines to prepare the blocked isocyanates. In contrast, the amines used in the present invention all yield a high state of cure. The three samples using phenylamines (samples 4–6) also have high cure times at 360°F. which leads to decreased product output. Sample 7 using a monophenyl diisocyanate yielded a significantly inferior balance of scorch safety and cure rate, i.e., a high $T_c/T_s$ value, compared to samples 8 and 9 employing the diphenyl diisocyanates of this invention. Sample 10 uses a diisothiocyanate of the invention, and a good balance of safety and cure rate was obtained.

I claim:

1. A composition comprising (1) a sulfur-vulcanizable rubber having from about 0.5 to 50% by weight of olefinic unsaturation derived from conjugated diolefins containing from 4 to 6 carbon atoms, (2) sulfur, (3) a metal vulcanization activator selected from the group consisting of metal oxides, hydroxides, and salts wherein the metal is selected from the group consisting of zinc, cadmium, lead, calcium and iron, and (4) an accelerator system consisting essentially of (a) a 2-thiobenzothiazole accelerator of the formula

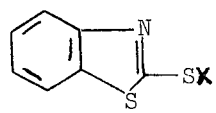

wherein X is selected from the group consisting of hydrogen, 2-thiobenzothiazole, an amine, alkyl, aryl, alkaryl, halo, nitro, anilino, 5- or 6-membered heterocycles containing oxygen, nitrogen, or sulfur heteroatoms, a monovalent radical selected from the group consisting of ammonia, sodium, and potassium, and a divalent radical selected from the group consisting of calcium, zinc, cadmium, copper and lead, and attached thereto an alkyl, aryl, substituted aryl or a second thiobenzothiazole radical; and (b) an amine-blocked diisocyanate of (i) a heterocyclic amine having a pK dissociation constant of about 4 or below and (ii) a diisocyanate selected from the group consisting of diphenyl-diisocyanates and aromatic diisothiocyanates.

2. A composition of claim 1 wherein the total weight of 2-thiobenzothiazole accelerator and the amine-blocked diisocyanate is present at a level from about 0.5 to 8 parts by weight per 100 parts by weight of the rubber, and the weight ratio of the amine-blocked diisocyanate to 2-thiobenzothiazole accelerator is from about 0.2:1 to 4:1.

3. A composition of claim 2 wherein the amine-blocked diisocyanate is derived from (i) a heterocyclic amine selected from the group consisting of pyrrolidine, piperidine, 2-pipecoline, 3-pipecoline, and 4-pipecoline and (ii) a diisocyanate selected from the group consisting of diphenylmethane-p,p'-diisocyanate, di(3-methylphenyl)methane-p,p'-diisocyanate, diphenylisopropylidene-p,p'-diisocyanate, di(3-methylphenyl)-p,p'-diisocyanate, di(3-methoxyphenyl)p,p'-diisocyanate, p-phenylene diisothiocyanate, p-toluene diisothiocyanate, p-3-fluorophenyl diisothiocyanate, naphthalene-1,5-diisothiocyanate, and naphthalene-1,8-diisothiocyanate.

4. A composition of claim 3 wherein the metal vulcanization activator is a zinc salt of a fatty acid, and the 2-thiobenzothiazole is selected from the group consisting of 2-mercaptobenzothiazole, zinc-2-mercaptobenzothiazole and di-2-benzothiazole disulfide.

5. A composition of claim 4 where the amine-blocked diisocyanate is of pyrrolidine and diphenylmethane-p,p'-diisocyanate.

6. A composition of claim 4 where the amine-blocked diisocyanate is of piperidine and diphenylmethane-p,p'-diisocyanate.

7. A composition of claim 4 where the amine-blocked diisocyanate is of pyrrolidine and p-phenylenediisothiocyanate.

* * * * *